T. P. WALSH.
MACHINE FOR SELECTING, SPOOLING, SHEARING, AND DRAWING-IN YARN FOR AXMINSTER LOOMS.
APPLICATION FILED FEB. 28, 1910. RENEWED DEC. 24, 1917.

1,274,474.

Patented Aug. 6, 1918.
7 SHEETS—SHEET 1.

Witnesses:
A. C. Bowser.
E. R. Barker.

Inventor:
Thomas P. Walsh,
by Geo. H. Maxwell,
Attorney.

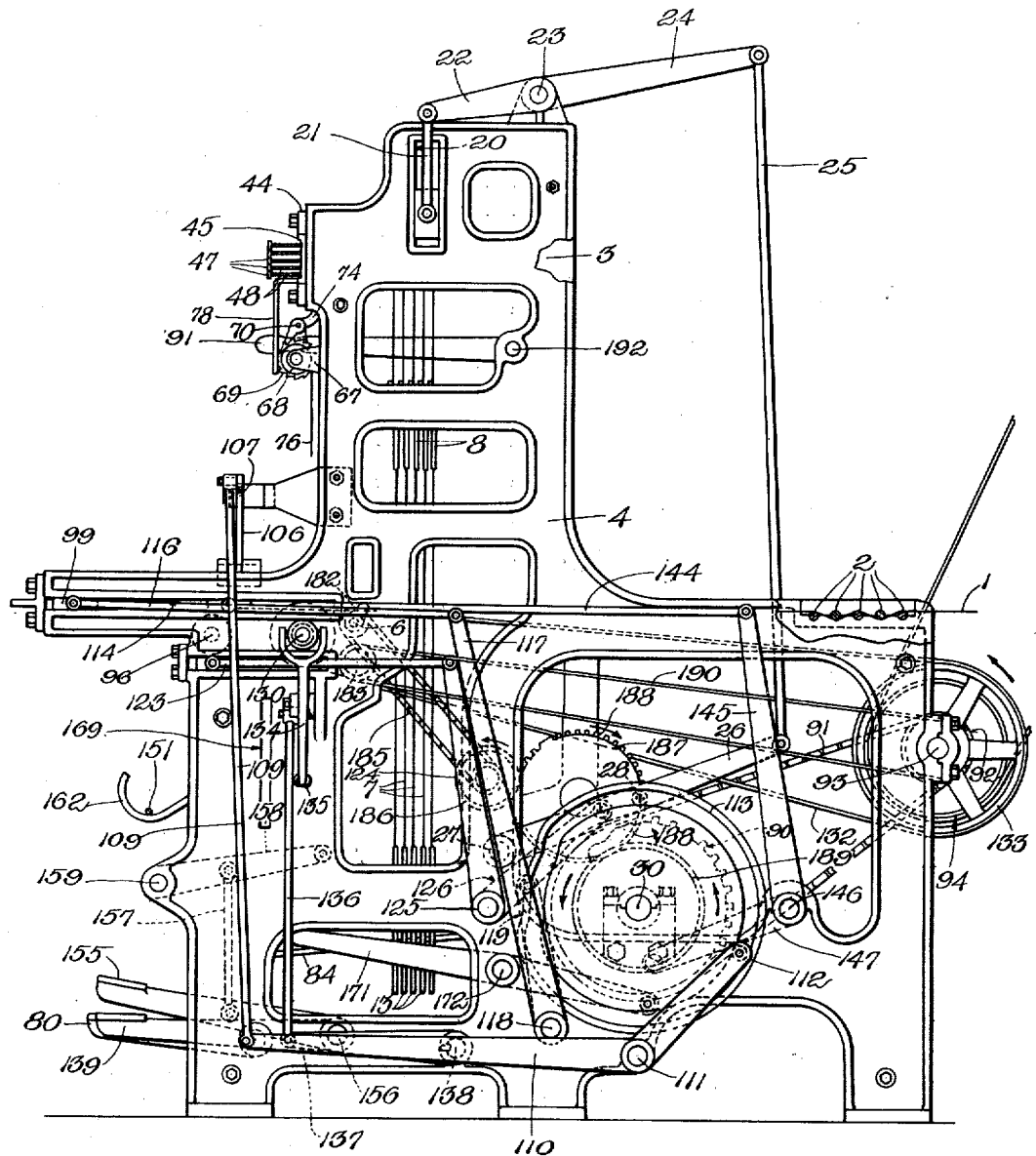

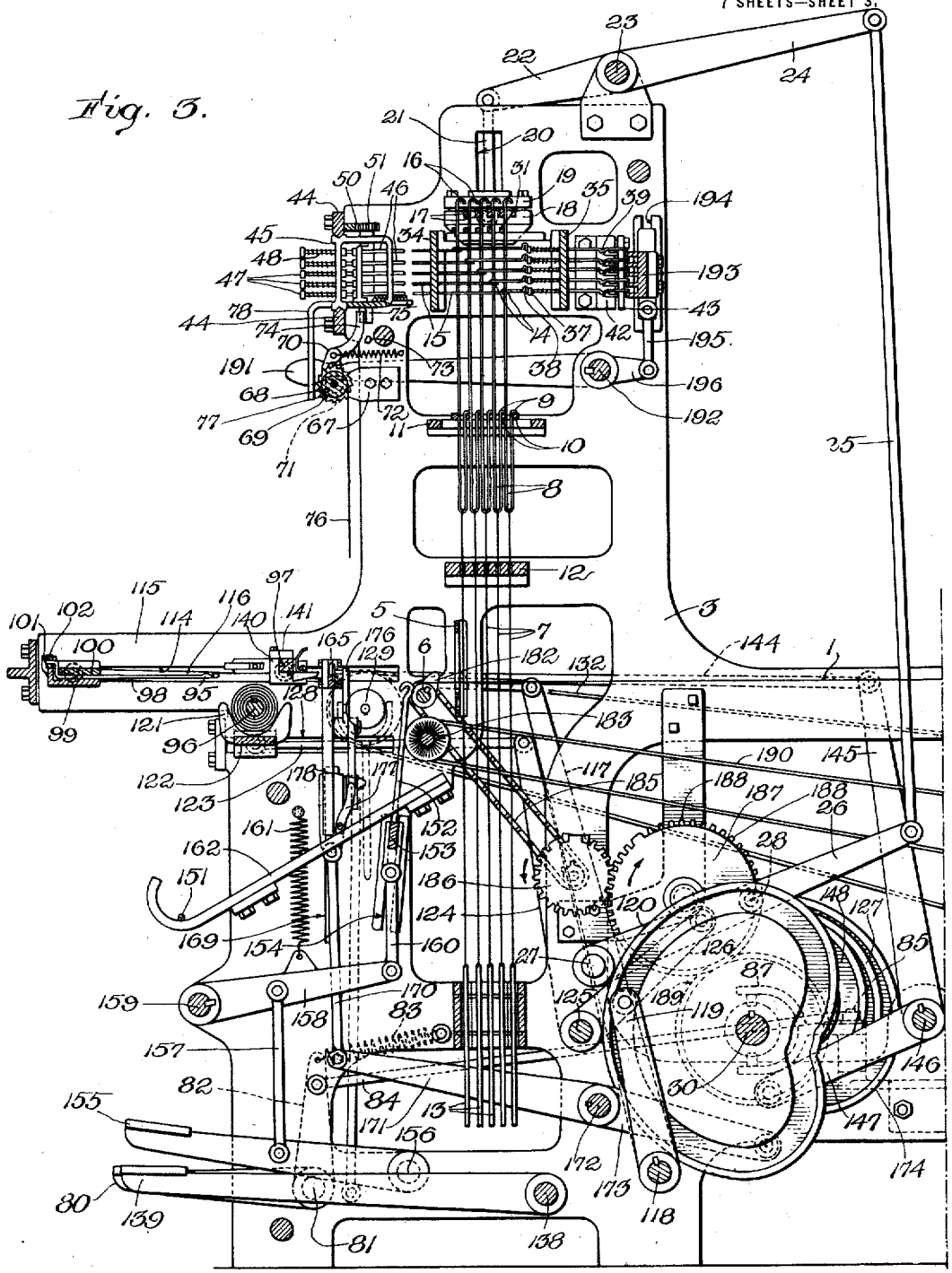

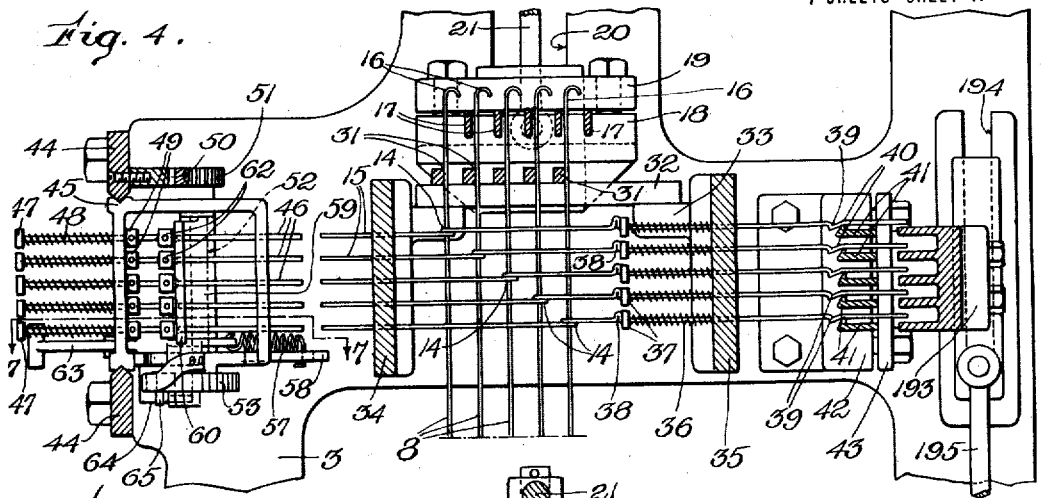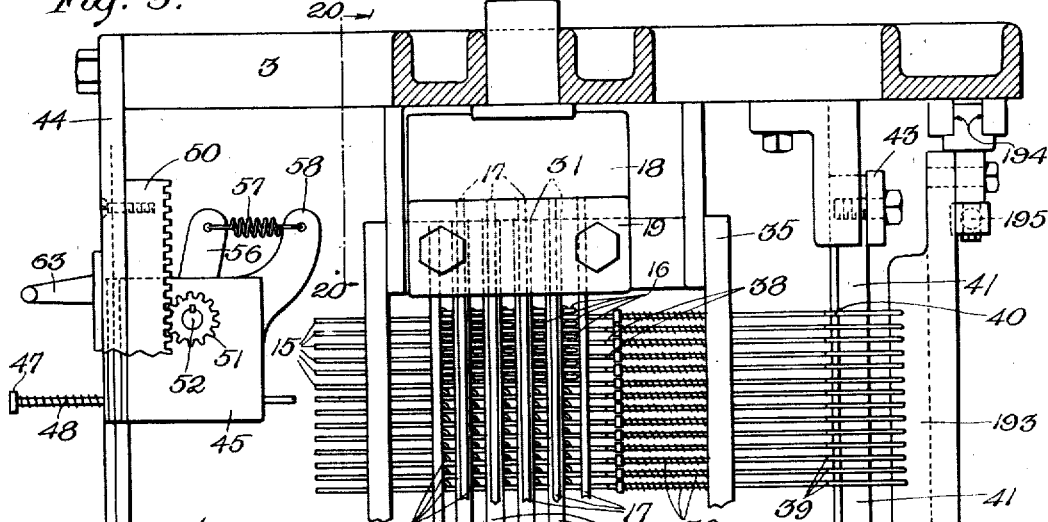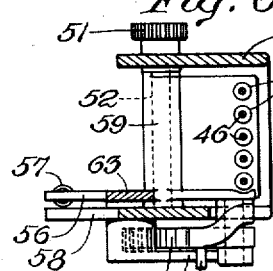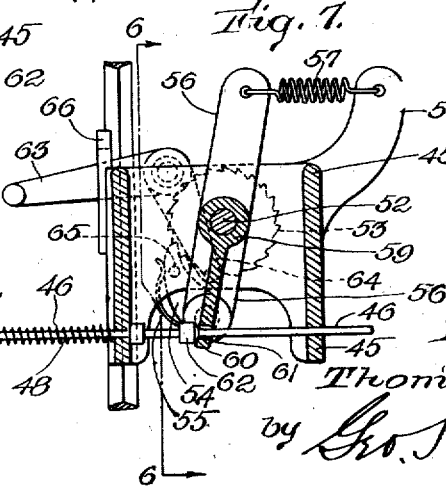

T. P. WALSH.
MACHINE FOR SELECTING, SPOOLING, SHEARING, AND DRAWING-IN YARN FOR AXMINSTER LOOMS.
APPLICATION FILED FEB. 28, 1910. RENEWED DEC. 24, 1917.
1,274,474.
Patented Aug. 6, 1918.
7 SHEETS—SHEET 5.
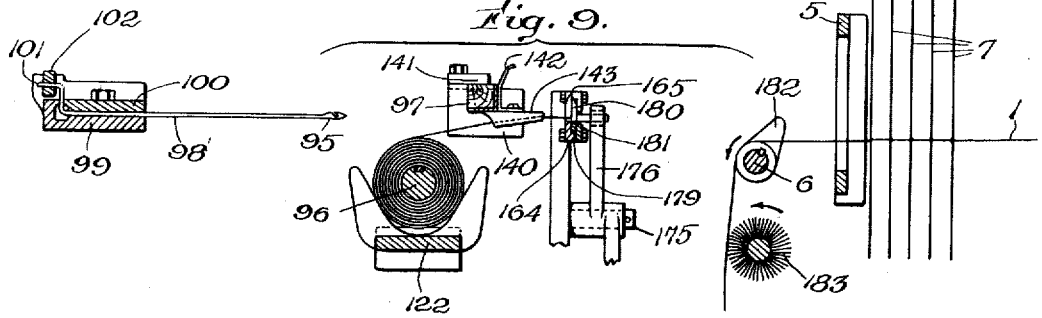
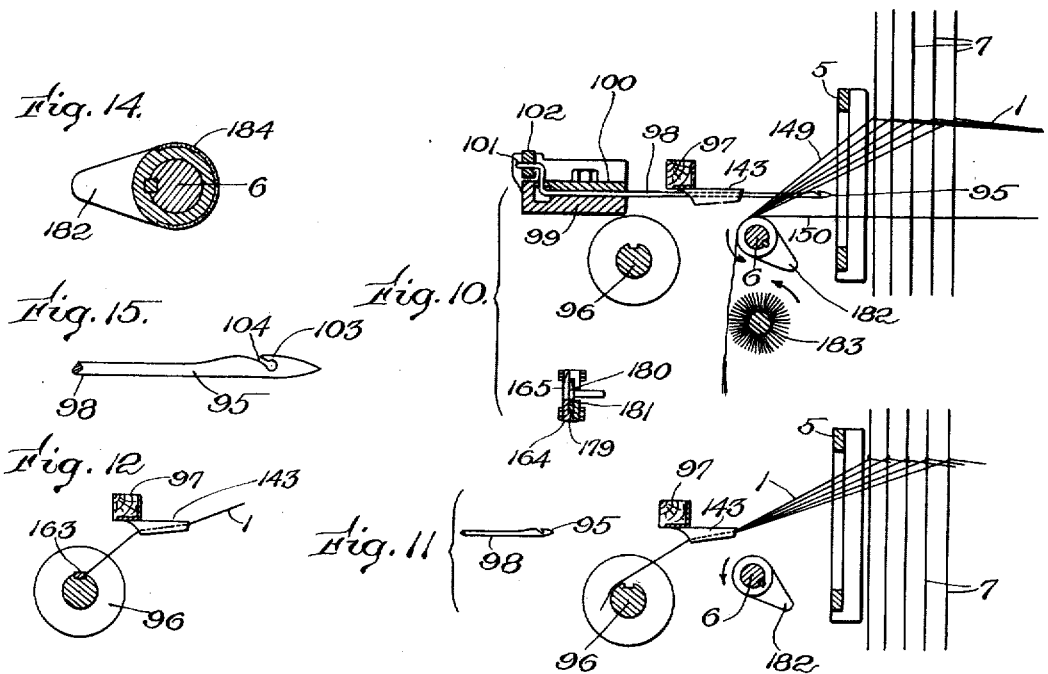
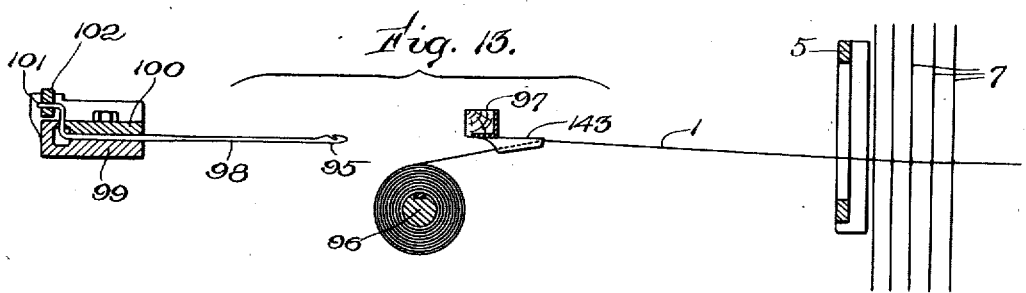
Witnesses:
H. C. Bowser.
E. R. Barker.
Inventor:
Thomas P. Walsh,
by Geo. H. Maxwell,
Attorney.

T. P. WALSH.
MACHINE FOR SELECTING, SPOOLING, SHEARING, AND DRAWING-IN YARN FOR AXMINSTER LOOMS.
APPLICATION FILED FEB. 28, 1910. RENEWED DEC. 24, 1917.
1,274,474.
Patented Aug. 6, 1918.
7 SHEETS—SHEET 6.
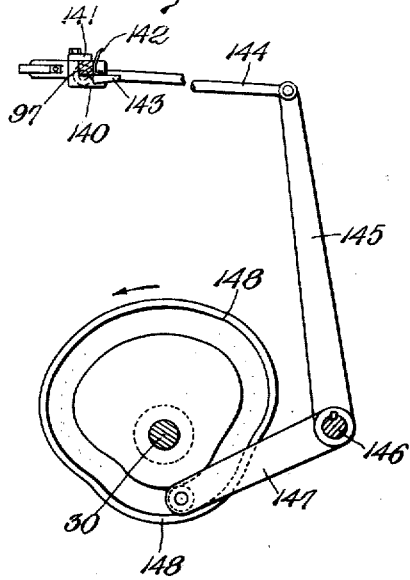
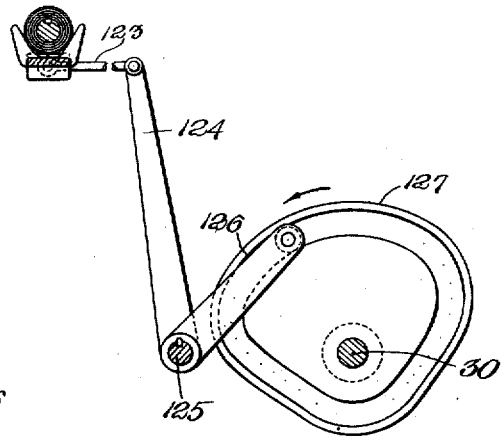
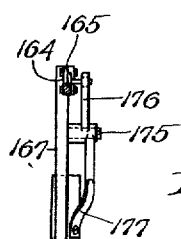
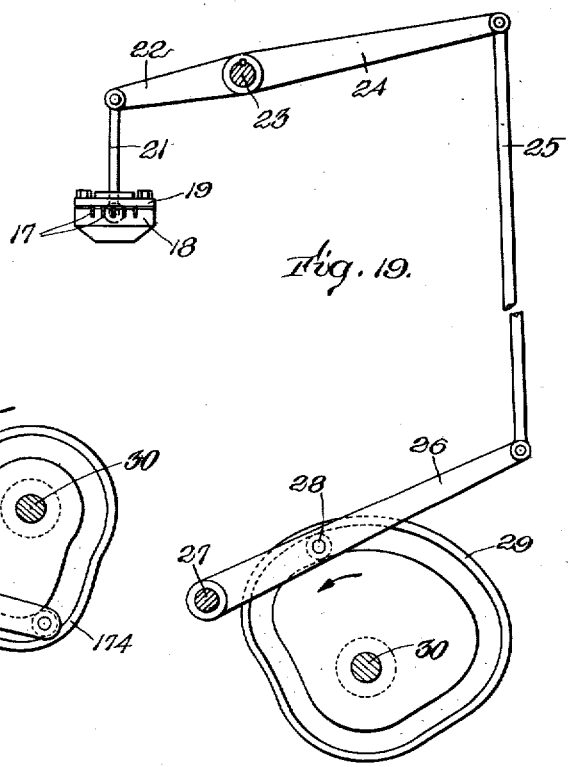

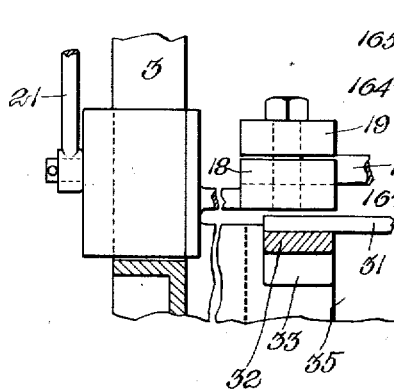
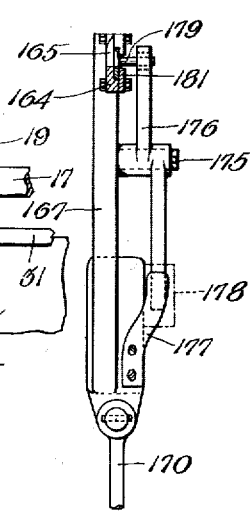
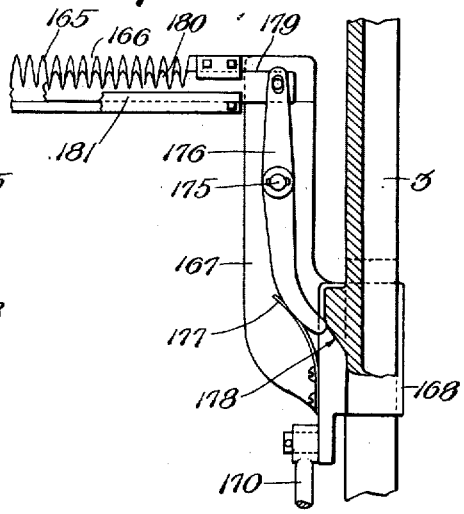
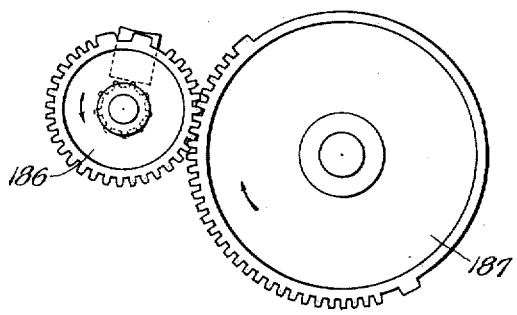
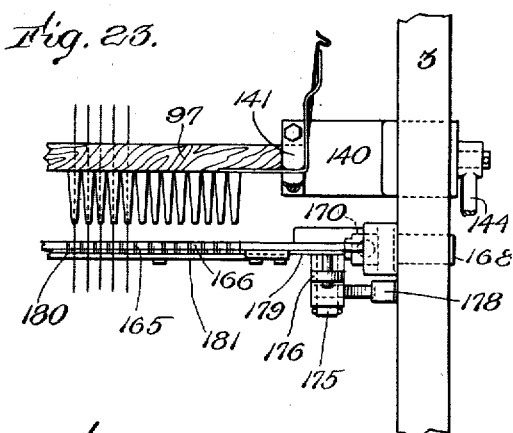
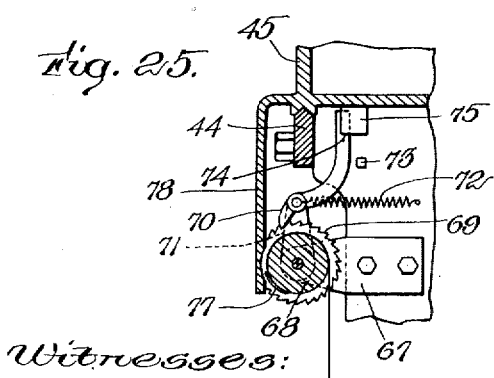
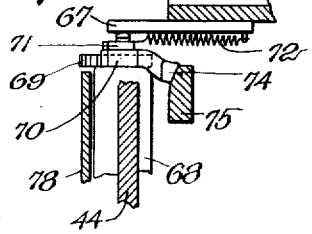

UNITED STATES PATENT OFFICE.

THOMAS P. WALSH, OF BOSTON, MASSACHUSETTS, ASSIGNOR, BY MESNE ASSIGNMENTS, TO AMERICAN WARP-DRAWING MACHINE COMPANY, A CORPORATION OF MAINE.

MACHINE FOR SELECTING, SPOOLING, SHEARING, AND DRAWING IN YARN FOR AXMINSTER LOOMS.

1,274,474.     Specification of Letters Patent.     Patented Aug. 6, 1918.

Application filed February 28, 1910, Serial No. 546,325. Renewed December 24, 1917. Serial No. 208,699.

*To all whom it may concern:*

Be it known that I, THOMAS P. WALSH, a citizen of the United States, and resident of Boston, in the county of Suffolk and State of Massachusetts, have invented an Improvement in Machines for Selecting, Spooling, Shearing, and Drawing In Yarn for Axminster Looms, of which the following description, in connection with the accompanying drawings, is a specification, like letters on the drawings representing like parts.

One of my principal objects is to avoid the necessity of the "threading" operation, so called, as heretofore known in this art, *i. e.*, the passing of the free ends of the threads of the wound spools through the tubes of the tube frame so as to project therefrom in proper position for the weaving operation. I accomplish this object, in the present embodiment of my invention, by passing the yarns directly from the creel or body of yarn supply through the tubes to the spool from the small end of the tubes to the larger end and thence directly to the spool, using the tubes as guides or directing means for maintaining the yarns in proper relative position while the yarns are being wound on the spools, and then, after the spool has been entirely wound, the yarns are severed from the main body of yarn supply at a point just back of the small ends of the tubes so that the ends of the yarns are already in the tubes and there is no necessity, therefore, of threading them into the tubes. Another principal object is to avoid the necessity of the "trimming" operation, so called, which has been made necessary in order to get the thread ends even after the wound threads have been threaded through the tubes and left with the weaving ends hanging out. By maintaining the threads uncut and under uniform tension until after the yarns are in final position in the tube frame and on the filled spool and then simply severing said yarns from the main supply, it is obvious that no trimming is necessary. Another principal object of my invention is to place the yarns in fully prepared position for weaving with extreme rapidity as compared with the prior art. To this end, I not only accomplish all the operations in one machine so that no carrying of the wound spool from the winding machine to a separate drawing-in machine and then to a trimming machine is necessary, but I provide means for accomplishing the selecting or "setting" of the yarns in accordance with the pattern mechanically, mechanical means for accomplishing all the required movements of the tube frame drawing-in mechanism, spool-carrier and winding mechanism, and coöperating means for maintaining the yarns at all times In properly ordered relation to themselves and to all the operative parts of the machine. As a means of still further promoting this cbject, I have rendered it possible to use in such a machine, certain loom elements which have been proved to have the highest efficiency for handling and selecting yarns, the chief thereof being the heddle, and I have provided a manually operated selective mechanism to coöperate with this heddle controlling mechanism as distinguished from a jacquard or other pattern control. Pattern mechanism for selecting the yarns to be wound, entails much delay and expense, as it necessitates the punching or other skilled preparation of the Jacquard cards or other pattern mechanism, the laborious connecting of the cards in their proper order for use in the pattern mechanism, and a system of storing the cards away, etc. Accordingly a further principal object of my invention is to eliminate the pattern mechanism and the said attendant detail, and I accomplish this result by providing mechanism directly operated by the selective action of the operator. Further features of my invention, in its preferred embodiment, reside in the provision of means for accomplishing the selection of the yarns progressively or dissimultaneously, means for lifting only those yarns which are selected, one color from each group or set of colors, means permitting the winding of successive spools with a given selection without further selective movement of the selective means, etc.

In the drawings,

Fig. 2 is a side elevation similarly broken away;

Fig. 3 is a central vertical sectional view

Fig. 4 is an enlarged sectional detail of the upper portion of Fig. 3;

Fig. 5 is a transverse sectional view showing in top plan the mechanism of Fig. 4;

Fig. 6 is a vertical sectional view on the line 6—6, Fig. 7;

Fig. 7 is a vertical sectional view on the line 7—7, Fig. 4;

Fig. 8 is a view in front elevation of the keyboard carriage, etc.;

Figs. 9–13 are vertical sectional views, partly diagrammatic, showing sufficient parts to illustrate the successive operative movements with relation to the yarns;

Fig. 14 is a transverse sectional detail of the comb;

Fig. 15 is an enlarged detail of one end of a drawing-in hook;

Fig. 16 is a sectional view showing in side elevation the cam and mechanism for moving the tube frame;

Fig. 17 is a sectional view showing in side elevation the cam and connected mechanism for moving the spool;

Fig. 18 is a sectional view showing in side elevation the cam and connected mechanism for raising and lowering the shearing device;

Fig. 19 is a sectional view showing in side elevation the cam and connected mechanism for raising the selected threads or yarns;

Fig. 20 is a vertical section on the line 20—20, Fig. 5, parts broken out for clearness;

Figure 1:
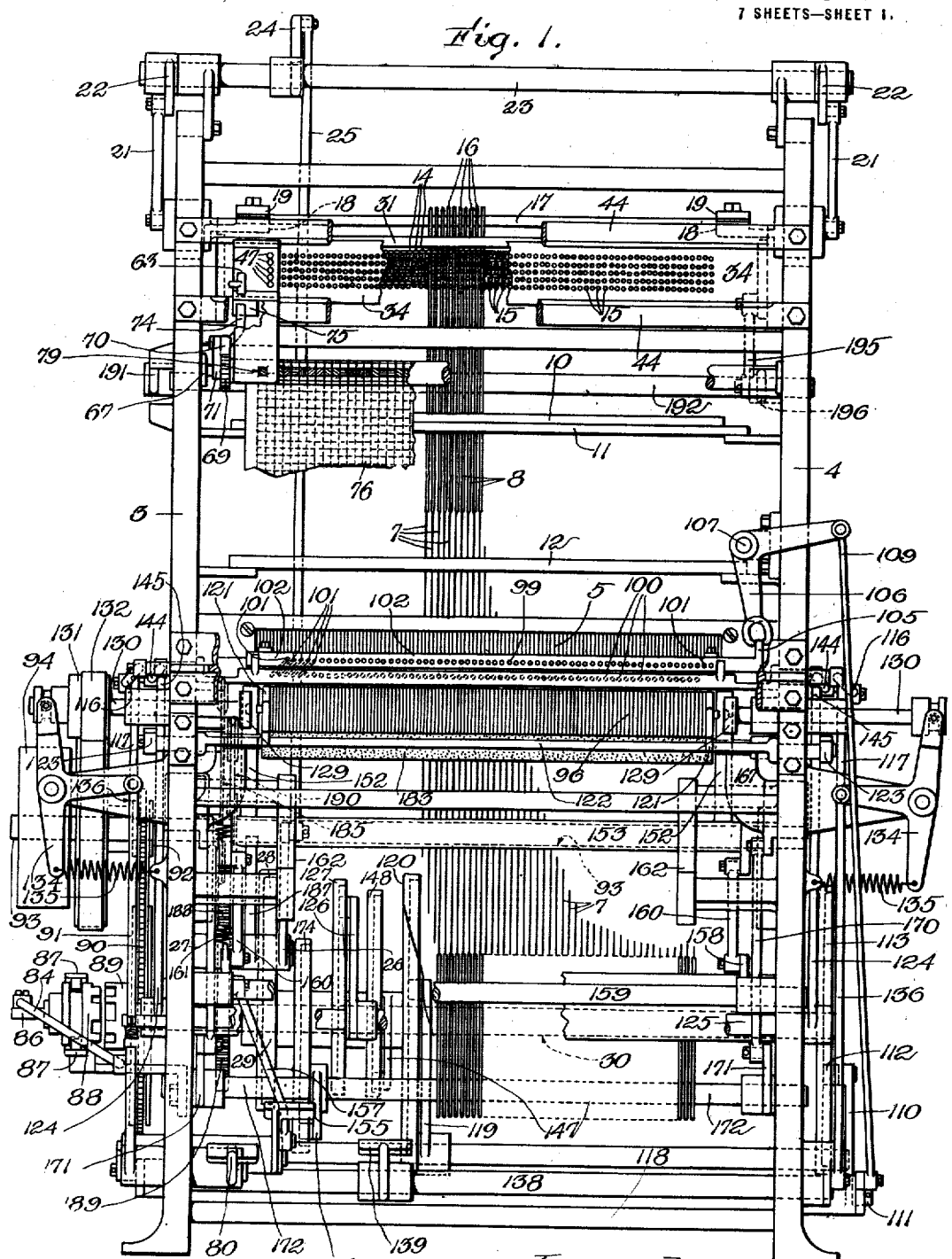
Figure 1 is a view thereof in front elevation, partly broken away to show parts behind.

Figs. 21, 22, and 23 are fragmentary views respectively in cross section, rear elevation, and top plan of the cutting mechanism;

Fig. 24 shows in front elevation a pair of mutilated gears which operate the revolving comb; and Figs. 25 and 26 are sectional views of details of the design-sheet holding and operating mechanism.

The general supply 1 of yarns of different kinds, colors, etc., according to the requirements of the given factory, is provided from any suitable creel frame or other well known mechanism (not shown) and led over tension rods 2 carried by the end frames 3, 4 of the machine proper to any suitable separating and supporting means whereby the yarns are maintained in unvarying arrangement or order, said means, for the purpose of this machine, being shown as a usual reed 5, whence the free ends of the yarns extend over a comb 6. Preferably adjacent the reed, I provide suitable yarn-controlling mechanism, herein shown as heddles 7 carried by lifter wires 8 whose supporting ends are outturned as indicated at 9 to rest on slats or transverse supporting bars 10 on top of a guide frame 11 substantially the same as in Jacquard looms, said heddles being further guided in a comber or compart board 12 and held down by any suitable mechanism, as lingoes 13. The upper ends of the lifter wires 8 extend through eyes 14 of indicator wires 15 of a suitable selective mechanism, and at their upper ends are hook-shaped, as shown at 16, to be engaged by lifting knives or bars 17 whenever moved into proper position by the selective mechanism. Said lifting knives or bars are removably supported at their ends in frames 18 and clamped by cap plates 19. The frames 18 slide vertically in guideways 20 in the end frames of the machine, being raised and lowered by rods 21, and levers 22 fast on the ends of a rock shaft 23 actuated by an arm or lever 24 connected by a link 25 to a cam lever 26 pivoted at 27 to the frame and having a roll 28 actuated by a cam 29 fast on a cam shaft 30. At the front of each transverse row of lifter wires 8 is a stop rod or bar 31 to stop the lifter wires from being moved forward too far, said stop bars 31 being supported at their ends by transverse rails 32 secured to ears 33 projecting from the end frames. The selective mechanism is best shown in Figs. 4, 5, and 6. In opposite supporting members or guide boards 34, 35 are mounted a series of indicators, herein shown as wires, which serve to guide, shift, and retain in selected position those lifter wires which are selected in response to the selecting portion of the selective mechanism. The wires 15 are normally held forward in the position shown in Fig. 4 by suitable means, as for example encircling springs 36 which bear against the board 35 at their rear ends and against collars 37 at their other ends, positioned by a crimp 38 in the wire. Each wire at its rear end is provided with a hook or shoulder 39 and an inclined surface 40 to coöperate with a stationary detent 41 herein shown as a transverse bar having an upturned front edge, said bars being held at their ends in brackets 42 and clamped in place by cap plates 43. While the mechanism thus far described may be used in connection with any kind of operating mechanism, automatic or otherwise, I have shown herein a keyboard arrangement, and preferably said keyboard extends only part way across the machine. In fact, I prefer to have the same restricted to the form of a narrow carriage having only a single row or bank of actuating members for selecting one yarn at a time only. I regard this feature of my invention, not only as a principal novel part of the invention, but as of extreme importance from a practical standpoint, although it will be understood that, viewed from the patent standpoint, the broad idea of having a keyboard arrangement is new, irrespective of the extent of the keyboard and irrespective of the manner or means by which the operator actuates the members 15 or the equivalent shifting means for controlling the selection of the yarns or threads. One reason why the preferred mechanism herein shown, in which a separate attachment is employed for engaging and actuating the members 15, is important from a practical standpoint, is that it prevents confusion and mistakes on the part of the operator, by avoiding a maze of indicating parts to be observed, it permits a relatively large visual indicator (which may be numbered, colored, or otherwise distinguished visually), and it makes repetitions or a plurality of movements for one selective position impossible. While I have provided a single mechanism for accomplishing these results, it will be understood that the results are separate and distinct and that separate mechanisms might obviously be provided for accomplishing each result. Mounted to travel on opposite transverse guides or guide rails 44 is a movable frame or carriage 45 which supports and guides a series of pushers or actuators shown as key-rods 46 provided at their outer ends with buttons or enlarged heads or finger rests 47 constituting visual indicators and normally held outward by springs 48 and limited by stops 49. Suitable step-by-step mechanism, preferably automatic, is shown for shifting the carriage 45 successively in front of the succeeding vertical rows or series of members 15 so that the actuators 46 may coöperate with each row 15 in succession one at a time step by step across the machine. The arrangement and movement are preferably for horizontal travel of the carriage and vertical position of the sets or banks of members 15, as I have found that this best conforms to the preferences of the operators. This movement is herein shown as accomplished by a rack bar 50 secured behind the upper guide rail 44, in which meshes a pinion 51 fast on a shaft 52 journaled vertically in the frame 45 and provided at its lower end with a ratchet 53 engaged by a pawl 54, held in by a spring 55 and pivoted at one end of a lever 56, herein shown as loosely pivoted on the shaft 52 and normally held by a spring 57 secured to the outer end of the lever and to a bracket 58 on the frame 45. This lever has a long sleeve 59 and vertical web-like portion 60 provided adjacent its outer edge with openings 61 for receiving the actuators 46 which are provided with enlargements or collars 62 by means of which, whenever any one actuator 46 is moved inwardly, the lever 56 and hence the pawl 54 is correspondingly moved and as soon as pressure is removed from the actuator 46 the spring 57 immediately causes said pawl to rotate the shaft 52 by the engagement of said pawl with its ratchet 53 and thereby, through the rack and pinion 50, 51, feed the carriage 45 one step to the right, Fig. 1, in position to coöperate with the next vertical row or set of shifting members or indicators 15. When the carriage has thus been moved step by step to the right entirely across the machine, the operator moves to the left an offset lever 63 whose inner end 64 thereby swings against a pin 65 projecting from the pawl 54, which releases said pawl, thereby disengaging the pawl and ratchet mechanism from the actuators 46, so that the operator, simply by continuing his pressure to the left on the lever 63, can slide the carriage quickly back to its starting position. The lever 63 gets a bearing against a lug or stop 66 on the front side of the carriage 45 to aid in the positive restoring movement of the carriage to the left. Preferably at some convenient point, as on end brackets 67 just below the lower track 44, I mount a design-sheet or pattern carrier, herein shown as a roll 68 provided at one end with a ratchet wheel 69 to be ratcheted around step by step by a pawl 70 pivoted at the upper end of a swinging arm 71 normally held back by a spring 72 against a stop 73 in position to have its tail end 74 engaged by a beveled or cam-shaped actuator 75, herein shown as depending rigidly from the bottom of the carriage 45. Thus after the operator has selected a row of yarns across the machine in the manner described, by the aid of the mechanism of the carriage 45, and restores the carriage to starting position ready to select another complement of yarn, the cam 75, through the pawl and ratchet mechanism, automatically turns the roll 68 one notch forward, thereby correspondingly moving the design sheet 76 which is supported thereby in any suitable manner, being herein shown as having its front edge secured under clips 77, thereby bringing the next row of color indications of the design sheet into operative position with relation to a down-hanging shield and side plate 78, which performs two functions, viz., it conceals or shields the general mass of color sections of the design sheet from the operator's vision, thereby preventing fatigue and promoting accuracy, and it reveals through an opening 79 the particular color required by the design for a given position of the carriage.

A row of selections having been accomplished as above explained, the operator depresses a treadle 80 fast at 81 on a rotary stud which carries an arm 82 normally held back by a spring 83 and connected by a link 84 to a bell crank pivoted at 85, one arm 86 of which extends laterally of the machine, as shown in Fig. 1, and the other arm of which ends in a usual shipper fork 87 (Figs. 1 and 3) for operating the movable member 88 of a clutch, keyed to the shaft 30, into engagement with the continuously rotary member 89 which is loose on said shaft and is driven by a sprocket chain 90 engaging a sprocket wheel 91 on the clutch member 89 and a sprocket wheel 92 fast on the driving shaft 93, which is driven by a belt pulley 94. When the treadle 80 is depressed, the clutch is thrown into driving position, thereby rotating the cams carried by said shaft. The cam 29 raises the lifting-knife frames 18, whose lifting knives or bars 17 engage and lift those lifter wires 8 which have been pushed inwardly or selected by the operator. This raises the selected warp threads from the position shown in Fig. 9 to the position shown in Figs. 10–12. As herein shown, the movements are such that at the same time the drawing-in hooks move inwardly and also the spool 96 and the tube frame 97. The drawing-in hooks are best shown in Figs. 1, 3, 9, 10, 13, and 15, where it will be seen that the rear ends of their round shanks 98 are mounted to rotate in a hook carrier 99, being held in place by a top plate 100, and have their rear extremities upwardly bent and out-turned to constitute crank portions 101 all held in a longitudinally movable hook rocker 102. At their forward ends the needles are provided with a hook 103 formed by a rearwardly extending oblique slit 104 formed in the top edge of the hook member, as shown in Fig. 15. The hook rocker or bar 102 has an upwardly projecting lug 105 at its right hand end, Fig. 1, engaged by the arm 106 of a bell crank pivoted at 107 on the frame of the machine and actuated by a link 109, elbow lever 110, pivoted at 111 on the frame, having a roll 112 driven by a cam 113 on the shaft 30, as best shown in Fig. 2. The hook carrier 99 slides at its ends in guideways 114 provided in outwardly extending portions 115 of the end frames. At its ends, the carrier is connected by links 116 to levers 117 fast on a shaft 118 carrying an arm 119 whose roll is actuated by a path cam 120, Figs. 1 and 3. The spool 96 rests in a support, herein shown as end crotches or V-shaped brackets 121 which engage the ends of the spools for the purpose of carrying the spools in and out to the rotating or winding mechanism. These crotches 121 are carried by a transverse plate or frame piece 122 connected at its ends by links 123 to levers 124 fast on a shaft 125 provided with an arm 126 actuated by a cam 127, see Fig. 17. The spool carriage moves in horizontal slots 128, and when it reaches its inner position brings the ends of the spool into driven relation to holding heads 129, Fig. 1, on the inner ends of rotary rods or shafts 130, one of which, herein shown as at the left end of the machine, is positively driven by a pulley 131 and driving belt 132 driven by a pulley 133 on the driving shaft 93, said two shafts 130 being simultaneously moved inwardly into positive engagement with the spool ends by T-levers 134 normally held under outward tendency by springs 135 and moved inwardly by links 136, Fig. 2, and levers 137 fast on a shaft 138 rocked by a foot treadle 139. The tube frame 97 is supported at its ends in carriers 140, Figs. 9, 23, and held by pivoted buttons 141 and springs 142 in the position shown best in Fig. 9, with its tubes 143 projecting rearwardly horizontally with their larger ends toward and in alinement with the drawing-in hooks. The tube-frame carriers 140 slide in the ways 114, being actuated by links 144, Fig. 16, connected to said carriers and levers 145 fast on a rock shaft 146 whose arm 147 is actuated by a cam 148. As a precaution, I prefer to use, after the yarns have been engaged by the drawing-in hooks and before said hooks have pulled the yarns through the tubes, means for positively separating or stripping the selected yarn-ends from those not selected, the selected yarns being indicated in Fig. 10 at 149, and those not selected at 150, and as herein shown I have provided for this stripping purpose a rod 151, see Fig. 3, which, when the parts are substantially in the position shown in Fig. 10, the operator places in the front corner of the opening or shed which is formed between the yarns 149 and 150, and pulls said rod forward sufficiently to be engaged by the hooked upper ends of pullers 152, Fig. 3 held at the ends of a bar 153 mounted to slide in ways 154 formed on the inner faces of the end frames, said hooks being lowered by a foot treadle 155 pivoted on the frame at 156 and connected by a link 157 to one of a pair of levers 158 on a rock shaft 159, said levers being connected to the bar 153 by links 160, said levers being moved upwardly by springs 161. When the hook members 152 pull the stripper rod 151 downwardly, it is caught by inclined shelves 162 which direct it to the front of the machine ready to be used again as shown in Figs. 1–3. As soon as the threads have been pulled through the tubes of the tube frame and have escaped from the drawing-in hooks, they drop into the position shown in Fig. 11 and are then secured in well known manner to the spool by any suitable means as by a clamping rod 163, Fig. 12. Thereupon the spool is rotated by the winding mechanism, being stopped by the operator when the required length of yarn has been wound thereon, and then the spool and tube frame are moved back to their starting position, which brings them into proper relation to shearing mechanism, which shears all the yarns evenly at the proper distance from the small ends of the tubes of the tube frame. The hooks and their operating mechanism constitute one moving means for the yarn, which, to distinguish it from the other yarn-moving means which does the winding, may be called a yarn-tubing means. In the machine of the drawings, this yarn-tubing is accomplished by moving the yarns from the source of supply through the tubes in a direction from the small, yarn-delivery, weaving end of the tubes to the large opposite end thereof into which the yarn moves when it is being delivered from the spool in the process of weaving. While the drawing in and winding are progressing, this shearing mechanism is down out of the way, as indicated in Fig. 10, but when ready to shear it is brought up to the position shown in Figs. 3 and 9. This shearing mechanism may be of any construction capable of severing the yarn, the preferred embodiment thereof being shown in detail in Figs. 21-23, where it will be seen that a relatively stationary blade 164, provided with a series of teeth or cutters 165 and intervening spaces 166 corresponding to the spacing of the yarns, for receiving said yarns, is rigidly secured to end supports 167 whose lower ends 168 slide in guideways 169 in the end frames of the machine, being raised and lowered by links 170, Fig. 18, and levers 171 on a rock shaft 172 provided with a lever 173 actuated by a cam 174. On the cutter frame or its end supports, I pivot at 175 a lever 176 whose lower end is normally held toward the frame by a spring 177, being actuated, when the cutting mechanism is raised, in an opposite direction by engagement with a cam surface 178 formed on the frame of the machine. At its upper end the lever 176 is pivoted to a reciprocating knife bar or cutting member 179 provided with teeth or cutters 180 spaced apart and formed substantially the same as the teeth or cutters 165. The bar 179 is provided with a slideway for maintaining it in proper cutting relation to the opposite bar or blade 164, being held in position by a guide plate 181. Thus when the mechanism in front of the severing device is moved forward out of the way and the severing device is moved up, all the wound and drawn-in yarns are sheared with clean even cuts simultaneously across the whole width of the machine.

As the yarns are severed, the severed ends of the supply yarns drop down to the position shown in Fig. 9. The rotary comb 6 starts turning just before the shearing, so that its teeth 182 arrive at approximately the position shown in Fig. 9 while the yarns are still taut and hence the said teeth are sure to enter properly between the yarns for the purpose of thereafter holding them spaced accurately. Also preferably the comb is rotary and turns in the direction of the arrow so that its teeth, when they engage the yarns, are close to the dents of the reed, where the yarns are necessarily held in proper spaced relation by the reed, and hence the teeth of the comb enter properly between the yarns. In the path of the downhanging ends of the yarns is a brush 183, preferably rotating continuously, for pulling out, straightening, and maintaining taut the ends of the yarns and otherwise coöperating to facilitate the general operation of pulling in the yarns. Preferably also as much of the surface as possible of the comb body is provided with a friction surface by and suitable means, as by a layer 184 of felt or other properly rough material, see Fig. 14. The comb is driven by a sprocket chain 185, Fig. 2, mutilated gears 186, 187 (shown enlarged in Fig. 24) and spur gears 188, 189, the former being fast on the mutilated gear 187 and the two mutilated gears turning on stub shafts extending inwardly from the frame 3. The brush 183 is driven by a belt or cord 190 from the shaft 93.

As it frequently happens that it is desirable to wind a number of spools exactly alike, I have shown my preferred construction as containing means (for example, the locking plates 41) whereby any given set of selected yarns may remain selected as long as desired while the spooling, drawing-in, and shearing mechanisms operate repeatedly. When another set of yarns is to be selected for a different pattern or combination of colors, the operator, by pressing down on a lever 191 fast on a shaft 192, thereby lifts a series of bars or transverse trips 193, which engages the tail ends or rear ends of the indicator wires 15, thereby releasing them from the locking plates 41 so that their springs 36 immediately restore the lifter wires 8 to inoperative position. The trips 193 are herein shown, Fig. 4, as consisting of thin projecting blades extending from the front side of a vertical cross bar whose ends are mounted to slide in ways 194 when raised by links 195 and levers 196 projecting rearwardly from the rock shaft 192, as best shown in Fig. 3.

In use, let us suppose that the machine is employed in all its complete embodiment as already fully described (although it will be understood that many of the segregated features may be omitted, and various thereof used without the others in other combinations). Having placed the design sheet (for example of a usual Axminster carpet) on its roll 68 and secured its front end thereto, the operator presses on the key or head 47 of the actuator corresponding to the particular yarn indicated by the pattern sheet through the opening 79 in the shield plate 78 which depends from the carriage 45. This inward pressure on the actuator 46 results in similarly moving the indicator wire which controls the selected yarn, said wire being caught and locked in retracted position by the detent or locking plate 41 which engages the catch 39 of the wire. This moves the hooked end 16 of the selected lifter wire 8 whose heddle 7 carries the selected yarn, into backward position directly in the path of vertical movement of one of the lifting knives or bars 17. The inward movement of the actuator 46 operates through the parts shown in Fig. 7 to rotate the shaft 52 so as to move the carriage one space or step to the right by the rack and pinion mechanism 50, 51, Figs. 4 and 5, moving at the same time the shield plate 78 so as to uncover the next color indication of the design sheet. The operator immediately pushes on the key corresponding to said color, thereby selecting the next yarn in accordance with the design sheet. This operation is repeated until the entire selection of yarns has been made for the spool which is to be wound. All that the operator is required to do is to keep repeating the pushing-in movement once for each progressive movement of the keyboard carriage. This pressing-in movement places the controlling mechanism of the selected yarn in operative selected position, then feeds the carriage forward for the next selection, and also uncovers the next color indication of the design which the operator is following. Very little chance of error is possible, because the operator observes simply the one simple bank of keys (corresponding to the number of colors that may be used) and a single design color at a time, all the adjacent mechanism being largely covered up or shielded from distracting the attention of the operator. The keys 47 are preferably colored to correspond with the standard colors of the design sheets with which the machine is apt to be used, so that the operator, having seen a given color through the indicator opening 79, naturally selects the same colored key. At this time or previously thereto, the operator places a spool 96 in its supporting carriage in the position shown in Fig. 3, and also puts a tube frame 97 into its carriers 140 and clamps it in position as shown in Figs. 3, 9, and 23. Having shifted back one selected lifter wire 8 in each set, as explained, so that there is one hook 16 vertically over a lifting bar 17 in each set of hooks throughout the width of the machine, the operator throws in the clutch 88, 89, thereby raising all the lifting knives 17 and consequently lifting all the selected yarns from their previous horizontal position to their position shown in Fig. 10. These yarns were all presumably held taut and strained parallel to each other before, but, even if not, the raising thereof compels them to assume an absolutely correct position with relation to each other because of the constant drag on their free ends of the rotating brush 183 supplemented by the dragging effect of the comb 6 and its friction surface 184, Fig. 14. While the selected yarns are assuming this raised position, the tube frame 97, spool 96, and drawing-in hooks 95 are all being moved forward to the position shown in Fig. 10, the hooks being given a slightly accelerated movement, so that preferably when the spool and tube frame have reached their inward position the hooks have passed through the tubes of the tube frame and are engaging or about to engage the selected yarns, preferably close to the reed. The inward movements of the tube frame and spool are accomplished respectively by the mechanisms shown in Figs. 16 and 17, and the inward movement of the drawing-in hooks is accomplished by the cam 120, Fig. 3, and parts operated thereby. Just as the drawing-in hooks are entering between the selected and raised threads, they are turned from their vertically edgewise position to a horizontal position by the longitudinal movement of the bar 102 actuated by the cam 113, Figs. 1 and 2. The spool and tube frame now remain stationary for a slight interval, while the drawing-in hooks move back slightly in a flat position until the yarn adjacent each hook has slid over the curved surface, Fig. 15, and along the oblique slot 104 into the hook, whereupon all the hooks are rotated back again into vertical position, as required for their subsequent backward movement through and out of the tubes of the tube frame, said turning of the hooks also giving them a proper grasp on the yarn for rendering the operation still more certain. The flattened outer or hooked end of the drawing-in hooks is made as wide as the spacing of the tube frame and the yarns will allow, in order that when turned flatwise in a horizontal plane the width of one hook will coöperate with the next hook to form a directing surface for the embraced yarn which will compel the yarn to be directed into the hook. As soon as the yarns have been engaged and before the hooks have moved the yarns forward appreciably toward the tubes of the tube frame, preferably the operator releases his foot from the treadle 80 so as to halt the machine while he places the stripper rod 151 in the shed between the lifted yarns 149 and the yarns 150, Fig. 10, and pulls said rod into position in the hooked ends of the hook rods 152, Fig. 3, and at once lowers the latter by pressing down on the treadle 155. This separates the selected yarns from the unselected yarns, preferably by moving the former from the main body of yarns, i. e., from the unselected yarns, so that when the former are pulled forward by the drawing-in hooks, their free ends are away from the latter and hence there is no tendency to pull up the unselected yarns into a tube or snarl them or disarrange them from their properly arranged taut position in the comb 6. The operator then depresses the treadle 80 again, whereupon the drawing-in hooks draw in the selected yarns through the respective tubes of the tube frame, and, as they move still farther back to the front of the machine, unthread and drop the free ends of the drawn-in yarns onto the adjacent spool in the position shown in Fig. 11. The operator now releases the treadle 80, fastens the free ends of the selected yarns onto the spool by the clamping bar 163, Fig. 12, and depresses the treadle 139, which instantly clamps the winding mechanism against the ends of the spool, with the result that the latter is rotated by the constantly rotating pulley 131 and belt 132. As soon as the required length of yarns has been wound on the spool, the operator releases the treadle 139 and again depresses the treadle 80, thereby retracting to their original position at the front of the machine the tube frame and spool, now wound and drawn-in with the required complement of selected yarns. As the spool and tube frame are moving to their outer position, the heddles 7 are being lowered so as to bring the selected yarns into horizontal position in the plane of the unselected yarns, and the comb 6 is making a revolution from its position, Fig. 11, so as to engage the descending threads and comb them out into their proper position with relation to the other threads. As soon as the tube frame has moved out of the way of the shearing mechanism, the latter rises and cuts off all the drawn-in and wound yarns, this shearing operation taking place while the teeth of the comb are in their upper position, as shown in Fig. 9. The aforesaid operations having been completed, the operator removes his foot from the treadle 80, unlocks the tube frame from its carriers, snaps it into its required position on the spool, and then takes out the spool and its tube frame in operative relation ready for use in the ordinary Axminster loom.

By accomplishing the drawing-in operation prior to the winding operation, the shearing may be postponed until after both of these operations. Also, it is of special advantage to accomplish the drawing-in of the yarns directly from the creel or main body of the yarn, as thereby the yarns remain under uniform tension, cannot possibly get out of position, and are guided by the tube frame into absolutely true smooth winding position on the spool. Also, this order of movement makes it possible to get the spool and tube frame close to the separating device (i. e., the reed, as herein shown) so that errors cannot reasonably occur. This also makes it possible to employ certain loom features which are recognized as having superior advantages in holding and manipulating yarns. I refer particularly to the heddles, reed, tension bars, and comber board and other adjacent guiding and positioning means. I have purposely aimed to devise a machine in which heddles might be employed because of their efficiency in maintaining the yarns separate for selective purposes. The arrangement mentioned provides means whereby proper separation of the yarns is rendered certain. By accomplishing the drawing-in operation before the shearing operation, I eliminate the necessity of special mechanism for holding the yarns in position for trimming, and eliminate entirely the necessity of trimming the yarn - ends. Also, by accomplishing the drawing-in before the winding, I eliminate special mechanism for laying the yarn in position on the spool. As all the pulling of the yarn from the creel is accomplished by the winding mechanism, the remaining parts may be light and simple, and the drawing-in operation may be accomplished simultaneously in all the tubes, as distinguished from dissimultaneously. Heretofore it has always been considered necessary to thread the yarn-ends through the tubes, i. e., to pull the free yarn-ends of the wound spool through from the larger ends of the tube out of the smaller ends thereof in position for weaving, whereas by my mechanism I eliminate the necessity for this threading operation and mechanism, because by delivering the yarns from the creel through the tubes to the spool for the winding operation, there is no necessity of this usual threading operation. Also by avoiding this threading operation the waste of yarn is eliminated which has heretofore resulted from the necessity of trimming or shearing off the ends of the yarns thus threaded. There is no trimming of the yarns whatever according to my invention, as all the operations are accomplished before the yarns are severed from the main body, and by having all the yarns held under proper even tension during all of these operations they are necessarily even when cut or severed from the main supply, and hence there is no necessity for trimming them or otherwise rendering them even by shearing off any portion of their ends. The combined turning and pulling operation of the drawing-in hooks is also of particular advantage, as this eliminates the necessity of lateral shifting mechanism for moving the yarn or bending it across the hook for hooking purposes. My invention, furthermore, provides means for maintaining all the yarns, at all times, in correct relative arrangement and parallelism. From a practical standpoint, it is of great advantage to maintain absolutely even tension on all the yarns of a spool from the beginning to the end, as thereby all the pile loops in the subsequent weaving are uniform, and the weaving can be continued to the end, which cannot be done when there are irregularities in the tension of the different yarns of a given spool. The tension rods 2 are provided not merely for tension but to spread out or scatter the great number of yarns sufficiently to prevent undue frictional contact of the selected yarns against the unselected yarns, and hence drawing or moving tendency when the former are being wound on the spool, the yarns being scattered by individually passing around different series, so that all the yarns do not together pass around the same rods. As previously mentioned, the keyboard selective mechanism is preferred, as it gives greater flexibility and range to the apparatus, while at the same time eliminating the expense, for instance, of punching jacquard cards, lacing them together, storing them away, or of setting and adjusting other forms of pattern control or selecting devices. Besides the broadly novel feature of selecting the yarns to be drawn in and wound by means of a keyboard action, I regard also as of particular value the provision of means whereby the operator is compelled to give his or her attention to one set of yarns at a time, as distinguished from having a keyboard extending the whole width of the machine. The latter would come within the spirit and scope of my invention, broadly considered, but by having a restricted keyboard carriage capable of attending to one set at a time only, the possibility of omitting a set or of selecting two yarns in a given set is practically eliminated. Also the fatigue on the eye and mind of the operator are very greatly reduced by this preferred construction. I prefer to have this keyboard travel, or at least to have only a restricted portion of the selectors accessible to the operator at one time, and preferably the traveling movement is from left to right, as being most natural to the operator in following the pattern. By lifting up the selected yarns, I am enabled to provide a greatly increased capacity, as practically an unlimited number of yarns may be employed by this heddle movement.

By the term "drawing-in", I mean to include any and all means of moving the yarn through the tubes.

Having described my invention, what I claim as new and desire to secure by Letters Patent is:

1. In a machine of the kind described, means to support the yarn guide tubes in position to be threaded, means to support a complement of yarns in position for threading, and yarn tubing means movable into the larger ends of the tubes and through the tubes into engagement with the yarns for thence moving with the yarns through the tubes in a direction from the yarn delivery weaving end of the latter to said large opposite end thereof.

2. In a machine of the kind described, means to support a spool and its yarn guiding tubes in relative position for threading the latter and winding the spool, and yarn tubing means movable through the tubes from the spool end of the latter to receive from the spool end of the latter to receive the yarns and thence back through the tube and out at the spool end with the yarns in the threading operation to leave the free ends of the yarns in winding position with relation to the spool.

3. A machine of the kind described, comprising means for supporting a complement of yarns with their free ends in position to be engaged, means for supporting the yarn guide tubes in position to be threaded, and tubing means movable through the tubes from the spool end of the tubes to the opposite ends to engage the said free ends of the yarns and thence back again with the yarns through the tubes and out at the spool end of the tubes.

4. In a machine of the kind described, the combination of means for delivering a complement of yarns from a general stock of yarn supply, means for supporting a tube frame in position to be threaded, tubing mechanism movable through the tubes from the spool end to the opposite end to engage the free ends of the yarns and to move thence back through the tubes with the yarns in the threading operation, and automatic severing mechanism for severing the yarns subsequent to the threading operation.

5. In a machine of the kind described, the combination of means for delivering a complement of yarns from a general stock of yarn supply, means for supporting a tube frame in position to be threaded, means to support a spool in position for winding, tubing mechanism movable through the tubes from the spool end to the opposite end to engage the free ends of the yarns and to move thence back through the tubes with the yarns in the threading operation and to deposit the yarns in position for winding, and automatic severing mechanism for severing the yarns subsequent to the winding operation.

6. In a machine of the kind described, means to support a spool and its yarn guiding tubes in relative position for threading the latter and winding the spool, and yarn tubing means movable simultaneously through all the tubes from the spool end of the latter to receive the yarns and thence back through the tube and out at the spool end with the yarns in the threading operation to leave the free ends of the yarns in winding position with relation to the spool.

7. In a machine of the kind described, means for delivering a supply of yarns, winding mechanism for winding yarns on a spool, severing mechanism for severing the yarns from said supply when the spool has been wound, and automatic power-operated straightening means for straightening out the deflected, severed yarn ends and maintaining in proper separated relation the severed ends of the supply yarns.

8. In a machine of the kind described, means for delivering a supply of yarns, winding mechanism for winding yarns on a spool, severing mechanism for severing the yarns from said supply when the spool has been wound, means for straightening out and maintaining in proper separated relation the severed ends of the supply yarns, and combing means engaging said ends for pulling the yarns taut.

9. In a machine of the kind described, means for delivering a supply of yarns, means for supporting a tube frame, drawing-in mechanism for drawing-in yarns into the tubes of said tube frame, means for operating said drawing-in mechanism, severing mechanism including operating means to sever the yarns from said supply after the drawing-in operation, and means for straightening out the deflected, severed yarn ends and maintaining in proper separated relation the severed ends of the supply yarns.

10. In a machine of the kind described, means for delivering a supply of yarns, winding mechanism for winding yarns therefrom on a spool, means for supporting a tube frame, drawing-in mechanism for drawing-in said yarns through the tubes of the tube frame, severing mechanism for severing the yarns from said supply subsequent to the winding and drawing-in operations, and rotary brushing means for straightening out and maintaining in proper separated relation the severed ends of the supply yarns.

11. In a machine of the kind described, means for supporting yarn guide tubes in psition to receive the yarns, a drawing-in hook for delivering the yarn through a tube, means for moving said hook through the tube transversely of and beyond the yarns and back again for drawing in the yarn, means for presenting the yarn in coöperative position for said hook, and means for rocking said hook prior to its engagement with the yarn, for facilitating said engagement.

12. In a machine of the kind described, means for supporting yarn guide tubes in position to receive the yarns, a series of drawing-in hooks for delivering the yarns through the tubes, means for simultaneously moving said hooks through the tubes transversely of and beyond the yarns and back again for drawing in the yarns, means for supporting the yarns in position to be engaged by the hooks, and means for rocking said hooks prior to their engagement with the yarns, for facilitating said engagement.

13. In a machine of the kind described, winding mechanism to wind a spool with a complement of selected yarns, yarn-supporting means, yarn-selecting mechanism for selecting the particular yarns for said complement to be wound, yarn-severing mechanism, and means for maintaining said yarn-selecting mechanism set for a given selection during a plurality of spool-winding operations.

14. In a machine of the kind described, winding mechanism to wind a spool with a complement of selected yarns, means for supporting the yarns to be selected, and yarn selecting mechanism for selecting the particular yarns for said complement to be wound, including a series of manually operated devices for controlling the yarn selections, and means for preventing the operation of more than one of said devices at a time.

15. In a machine of the kind described, winding mechanism to wind a spool with a complement of selected yarns, means for supporting the yarns to be selected, and yarn selecting mechanism for selecting the particular yarns for said complement to be wound, including a series of manually operated devices for controlling the yarn selections, and means for compelling the operation of said devices step by step across the machine.

16. In a machine of the kind described, winding mechanism to wind a spool with a complement of selected yarns, yarn-supporting means, and yarn-selecting mechanism for selecting the particular yarns for said complement to be wound, including a manually operated keyboard mechanism.

17. In a machine of the kind described, winding mechanism to wind a spool with a complement of selected yarns, means for supporting the yarns to be selected, and yarn-selecting mechanism for selecting the particular yarns for said complement to be wound, including selecting means operable progressively transversely of the body of yarns from which the selections are being made.

18. In a machine of the kind described, winding mechanism to wind a spool with a complement of selected yarns, means for supporting the yarns to be selected, and yarn-selecting mechanism for selecting the particular yarns for said complement to be wound, including a step-by-step device containing manually operated selective means for selecting any one of a plurality of yarns at each step progressively transversely of the body of yarns.

19. In a machine of the kind described, winding mechanism to wind a spool with a complement of selected yarns, means for supporting the yarns to be selected, means for supporting a design sheet in view of the operator, and means, including a keyboard device operated by the operator in accordance with said design sheet, for selecting said yarns to be wound.

20. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, and manually operated means for moving one positioning device and its yarn in each color set.

21. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, and a shifting device for each positioning means, said shifting device being capable of being manually operated.

22. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, a shifting device for each positioning means, said shifting device being capable of being manually operated, and means to maintain all of the selected positioning devices in selected position while the selected yarns are being manipulated.

23. In a machine of the kind described, winding mechanism to wind a spool with a complement of yarns selected from a larger body of yarns, yarn-selecting mechanism, including positioning means for controlling the position of each yarn of said body, said yarn and positioning means being arranged in color sets across the machine, a shifting device for each positioning means, said shifting device being capable of being manually operated, means to maintain all of the selected positioning devices in selected position while the selected yarns are being manipulated, and manually controlled means for restoring all of the selected positioning devices to their original position.

24. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, and an actuating device, including a laterally movable carriage and key mechanism for selecting any one positioning device in each color set as said carriage is moved transversely of the yarns.

25. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, and a laterally traveling manually operated selective device for selecting any one positioning device in each set, including step-by-step mechanism for shifting said device into successive operative positions.

26. In a machine of the kind described, winding mechanism to wind a spool with a complement of yarns selected from a larger body of yarns, yarn-selecting mechanism, including positioning means for controlling the position of each yarn of said body, said yarns and positioning means being arranged in color sets across the machine, and a laterally traveling manually operated selective device for selecting any one positioning device in each set, including step-by-step mechanism for shifting said device into successive operative positions, operated by the movement of said selective device.

27. In a machine of the kind described, yarn-positioning devices arranged in color sets for controlling successive complements of yarns composing a color set, and manually operated selective means for selecting one of said devices and yarns in each set, consisting of a carriage having a lateral movement from one side to another, and a series of reciprocating members corresponding to the series of said devices in a given set whereby the reciprocation of any one of said members actuates the corresponding one of said devices.

28. In a machine of the kind described, yarn-positioning devices arranged in color sets for controlling successive complements of yarns composing a color set, and manually operated selective means for selecting one of said devices and yarns in each set, consisting of a carriage having a lateral movement from one side to another, a series of reciprocating members corresponding to the series of said devices in a given set whereby the reciprocation of any one of said members actuates the corresponding one of said devices, and shifting means for said carriage actuated by the operation of said members to move the carriage to its successive positions.

29. In a machine of the kind described, winding mechanism to wind a spool with a complement of selected yarns, and yarn-selecting mechanism for selecting the particular yarns for the spool, including manually controlled means for determining the selection.

30. In a machine of the kind described, winding mechanism to wind a spool with a complement of selected yarns, and yarn-selecting mechanism for selecting the particular yarns for the spool, and color indicators to indicate to the operator the colors of the yarns in connection with said selecting mechanism.

31. In a machine of the kind described, drawing-in mechanism to place selected yarns through yarn guide tubes, and yarn selecting mechanism for selecting said yarns, including selection-determining means for varying a given selection at the will of the operator.

32. In a machine of the kind described, drawing-in mechanism to place selected yarns through yarn guide tubes, yarn-selecting mechanism for selecting said yarns, and visual indicators to indicate the colors of the yarns in connection with said selecting mechanism.

33. In a machine of the kind described, winding mechanism to wind a spool with a complement of selected yarns, means for delivering a supply of yarns, and yarn-selecting mechanism for selecting from said supply the particular yarns for the spool, including yarn-moving means to move solely the selected yarns, and yarn separating means for leaving the rest undisturbed.

34. In a machine of the kind described, drawing-in mechanism to place selected yarns through yarn guide tubes, means for delivering a supply of yarns, and yarn-selecting mechanism for selecting from said supply the particular yarns to be drawn in, including yarn-moving means to move solely the selected yarn, leaving the rest undisturbed.

35. In a machine of the kind described, winding mechanism to wind a spool with a complement of selected yarns, means for delivering a supply of yarns, and yarn-selecting mechanism for selecting from said supply the particular yarns for the spool, including yarn-moving means for supporting all the yarns in substantially the same horizontal layer or body as distinguished from a plurality of vertical groups, and means for moving therefrom only the selected yarns.

36. In a machine of the kind described, drawing-in mechanism to place selected yarns through yarn guide tubes, means for delivering a supply of yarns, and yarn-selecting mechanism for selecting from said supply the particular yarns to be drawn in, including yarn-moving means for supporting all the yarns in substantially the same horizontal layer or body as distinguished from a plurality of vertical groups, and means for moving therefrom only the selected yarns.

37. In a machine of the kind described, winding mechanism to wind a spool with a complement of selected yarns, means for delivering a supply of yarns, and yarn-selecting mechanism for selecting from said supply the particular yarns for the spool, including means for supporting the body of yarn in groups, and means for lifting one yarn only from each group, leaving the others undisturbed.

38. In a machine of the kind described, drawing-in mechanism to place selected yarns through yarn guide tubes, means for delivering a supply of yarns, and yarn-selecting mechanism for selecting from said supply the particular yarns to be drawn in, including means for supporting the body of yarn in groups, and means for lifting one yarn only from each group, leaving the others undisturbed.

39. In a machine of the kind described, winding mechanism to wind a spool with a complement of selected yarns, means for delivering a supply of yarns, and yarn-selecting mechanism for selecting from said supply the particular yarns for the spool, including means for supporting the body of yarn in groups whose individual yarns are normally held side by side substantially horizontal.

40. In a machine of the kind described, drawing-in mechanism to place selected yarns through yarn guide tubes, means for delivering a supply of yarns, and yarn-selecting mechanism for selecting from said supply the particular yarns to be drawn in, including means for supporting the body of yarns in groups whose individual yarns are normally held side by side substantially horizontal.

41. In a machine of the kind described, winding mechanism to wind a spool with a complement of selected yarns, means for delivering a supply of yarns, and yarn-selecting mechanism for selecting from said supply the particular yarns for the spool, including means for supporting the body of yarn in groups whose individual yarns are normally held side by side substantially horizontal, the yarns of a group occupying substantially the width of a spool-winding space.

42. In a machine of the kind described, drawing-in mechanism to place selected yarns through yarn guide tubes, means for delivering a supply of yarns, and yarn-selecting mechanism for selecting from said supply the particular yarns to be drawn in, including means for supporting the body of yarns in groups whose individual yarns are normally held side by side substantially horizontal, the yarns of a group occupying substantially the width between the centers of two adjacent tubes.

43. In a machine of the kind described, winding mechanism to wind a spool with a complement of selected yarns, means for delivering a supply of yarns, and yarn-selecting mechanism for selecting from said supply the particular yarns for the spool, including means for supporting the body of yarn in groups whose individual yarns are normally held side by side substantially horizontal, and means to lift one only of each group.

44. In a machine of the kind described, drawing-in mechanism to place selected yarns through yarn guide tubes, means for delivering a supply of yarns, and yarn-selecting mechanism for selecting from said supply the particular yarns to be drawn in, including means for supporting the body of yarns in groups whose individual yarns are normally held side by side substantially horizontal, and means to lift one only of each group.

45. In a machine of the kind described, winding mechanism to wind a spool with a complement of selected yarns, means for delivering a supply of yarns, and yarn-selecting mechanism for selecting from said supply the particular yarns for the spool, including heddles in yarn-supporting relation to the yarns of said supply.

46. In a machine of the kind described, drawing-in mechanism to place selected yarns through yarn guide tubes, means for delivering a supply of yarns, and yarn-selecting mechanism for selecting from said supply the particular yarns to be drawn in, including heddles in yarn-supporting relation to the yarns of said supply.

47. In a machine of the kind described, winding mechanism to wind a spool with a complement of selected yarns, and yarn-selecting mechanism for dissimultaneously selecting the particular yarns for said complement to be wound.

48. In a machine of the kind described, winding mechanism to wind a spool with a complement of selected yarns, yarn selecting mechanism for dissimultaneously selecting the particular yarns for said complement to be wound, drawing-in mechanism to place the selected yarns through yarn guide tubes, and means to operate said drawing-in mechanism to draw in all of said yarns simultaneously.

49. In a machine of the kind described, drawing-in mechanism to place selected yarns through yarn guide tubes, yarn-selecting mechanism for selecting the particular yarns to be drawn in, and means for maintaining said yarn-selecting mechanism set for a given selection during a plurality of drawing-in operations.

50. In a machine of the kind described, drawing-in mechanism to place selected yarns through yarn guide tubes, and yarn-selecting mechanism for selecting the particular yarns to be drawn in, including a manually operated key-board mechanism.

51. In a machine of the kind described, drawing-in mechanism to place selected yarns through yarn guide tubes, and yarn-selecting mechanism for selecting the particular yarns to be drawn in, including selecting means operable progressively transversely of the body of yarns from which the selections are being made.

52. In a machine of the kind described, drawing-in mechanism to place selected yarns through yarn guide tubes, and yarn-selecting mechanism for selecting the particular yarns to be drawn in, including a step-by-step device containing manually operated selecting means for selecting any one of a plurality of yarns at each step progressively across the body of yarn.

53. In a machine of the kind described, drawing-in mechanism to place selected yarns through yarn guide tubes, means for supporting a design sheet in view of the operator, and means operated by the operator in accordance with said design sheet for selecting said yarns to be drawn in.

54. In a machine of the kind described, drawing-in mechanism to place selected yarns through yarn guide tubes, means for supporting a design sheet in view of the operator, and means including a key-board device operated by the operator in accordance with said design sheet for selecting said yarns to be drawn in.

55. In a machine of the kind described, drawing-in mechanism to place yarns selected from a larger body of yarns through yarn guide tubes, yarn-selecting mechanism, including positioning means for controlling the position of each yarn of said body of yarns, said yarns and positioning means being arranged in color sets across the machine, and manually operated means for moving one positioning device at a time and its yarn in each color set.

56. In a machine of the kind described, drawing-in mechanism to place yarns selected from a larger body of yarns through guide tubes, yarn selecting mechanism, including positioning means for controlling the position of each yarn of said body of yarns, said yarns and positioning means being arranged in color sets across the machine, and a shifting device for each positioning means, said shifting device being capable of being manually operated.

57. In a machine of the kind described, drawing-in mechanism to place yarns selected from a body of yarns through the guide tubes of a tube frame, yarn-selecting mechanism, including a heddle for each yarn of said body of yarns, said yarns and heddles being arranged in successive sets of colors across the machine, and means for moving one heddle and its yarn in each color set.

58. In a machine of the kind described, drawing-in mechanism to place the yarns selected from a body of yarns through the guide tubes of a tube frame, yarn-selecting mechanism, including a heddle for each yarn of said body of yarns, said yarns and heddles being arranged in successive sets of colors across the machine, and manually operated means for moving one heddle and its yarn in each color set.

59. In a machine of the kind described, winding mechanism to wind a spool with a complement of yarns selected from a larger body of yarns, yarn-selecting mechanism, including a heddle for each yarn of said body, said yarns and heddles being arranged in color sets across the machine, and a laterally traveling manually controlled selective device for selecting any one heddle in each set.

60. In a machine of the kind described, drawing-in mechanism to place a complement of yarns selected from a larger body of yarns through the guide tubes of a tube frame, yarn-selecting mechanism, including a heddle for each yarn of said body, said yarns and positioning means being arranged in color sets across the machine, and a laterally traveling manually controlled selective device for selecting any one heddle in each set.

61. In a machine of the kind described, winding mechanism to wind a spool with a complement of yarns selected from a larger body of yarns, yarn-selecting mechanism, including a heddle for each yarn of said body, said yarns and heddles being arranged in color sets across the machine, and a laterally traveling manually controlled selective device for selecting any one heddle in each set, including step-by-step mechanism for shifting said selective device into successive operative positions.

62. In a machine of the kind described, drawing-in mechanism to place a complement of yarns selected from a larger body of yarns through the guide tubes of a tube frame, yarn-selecting mechanism, including a heddle for each yarn of said body, said yarns and positioning means being arranged in color sets across the machine, and a laterally traveling manually controlled selective device for selecting any one heddle in each set, including step-by-step mechanism for shifting said selective device into successive operative positions.

63. In a machine of the kind described, winding mechanism to wind a spool with a complement of selected yarns, means for supporting a design sheet in view of the operator, means operated by the operator in accordance with said design sheet for selecting said yarns to be wound, and means for automatically indicating to the operator the successive portions of the design to be followed.

64. In a machine of the kind described, drawing-in mechanism to place a complement of selected yarns through the guide tubes of a tube frame, means for supporting a design sheet in view of the operator, means operated by the operator in accordance with said design sheet for selecting said yarns to be drawn in, and means for automatically indicating to the operator the successive portions of the design to be followed.

65. In a machine of the kind described, yarn-selecting mechanism, means for supporting a design sheet in view of the operator to be followed in making selections, and a shield movable step-by-step from one portion of the design sheet to another, said shield having means for exposing a restricted part of said sheet for indicating to the operator the successive parts of the design sheet which are to be followed.

66. In a machine of the kind described, winding mechanism, and toothed severing mechanism normally at one side of the web of yarns being wound, said severing mechanism including two cutter bars arranged to receive the yarns between the teeth, said teeth being movable between the yarns, and means coöperating with the movement of the bars into yarn-engaging position to shift one bar lengthwise of the other with a shearing movement.

67. In a machine of the kind described, means for manipulating a series of yarns, including means to move certain of said yarns from the level of the others, and stripper mechanism, including a member entering between said separated yarns transversely thereof, and means for moving said member lengthwise of the yarns with a stripping movement.

68. In a machine of the kind described, means for manipulating a series of yarns, including means to move certain of said yarns from the level of the others, and mechanism for stripping said moved yarns and the others apart.

69. In a machine of the kind described, means for supporting the yarns, selective mechanism for selecting the yarns to be wound, winding mechanism for winding the yarns on a spool, and a series of transverse tension rods sufficient in number with relation to the number of yarns to permit said yarns to be scattered thereamong, for preventing undue frictional contact of the selected yarns against the unselected yarns when the former are being drawn longitudinally in their winding movement.

70. In a machine of the kind described, winding means to wind a complement of selected yarns on a spool, means, including a jacquard, for positioning the selected yarns for delivery to the spool, and manually operated selective mechanism for controlling the jacquard.

71. In a machine of the kind described, winding means to wind a complement of selected yarns on a spool, means, including a jacquard, for positioning the selected yarns for delivery to the spool, and a key device for determining the yarns to be positioned by the jacquard.

72. In a machine of the kind described, winding means to wind a complement of selected yarns on a spool, manually governed selective mechanism operable step by step transversely of the yarns for selecting successive yarns variably in accordance with the wish of the operator, and a jacquard controlled by said selective mechanism for moving the yarns to position in accordance with their said selection.

73. In a machine of the kind described, winding means to wind a complement of selected yarns on a spool, a key device for determining the yarn selections, a jacquard controlled by the key device, means to lock the jacquard in accordance with said selections and means to operate the jacquard to position the selected yarns after it has been so controlled and locked.

74. In a machine of the kind described, winding means to wind a complement of selected yarns on a spool, a key device for determining the yarn selections one at a time, a jacquard controlled by the key device, means to lock the jacquard in step with said selections and in accordance with said selections, and means to operate the jacquard to position the selected yarns after it has been so controlled and locked.

75. In a machine of the kind described, winding means to wind a complement of selected yarns on a spool, and yarn selecting and positioning mechanism, including a key device for making the selections dissimultaneously.

76. In a machine of the kind described, yarn supporting means, winding means to wind a complement of said yarns on a spool, and yarn selecting and positioning mechanism, including operating means and connections for moving the selected yarns from the unselected yarns, the latter remaining undisturbed.

77. In a machine of the kind described, yarn supporting means adapted to support adjacent groups of color yarns, winding means for winding a complement of said yarns on a spool, mechanism for selecting and moving one color yarn only in each group into selected position and separated from the rest of the yarns of the group, and positioning means for the selected yarns.

78. In a machine of the kind described, winding mechanism to wind a spool with a complement of selected yarns, and yarn selecting and positioning mechanism, including locking means for maintaining said selection while a plurality of spools are being wound therefrom with the same selection, said machine including means for permitting the winding of successive spools without disturbing said selection.

79. In a machine of the kind described, winding mechanism to wind a spool with a complement of selected yarns, and yarn selecting and positioning mechanism, including locking means for maintaining said selection subject to the will of the operator, said machine including means for permitting the winding of successive spools without disturbing said selection.

80. In a machine of the kind described, winding mechanism to wind a spool with a complement of selected yarns, and yarn selecting and positioning mechanism, including locking means for maintaining said selection while a plurality of spools are being wound therefrom with the same selection, and a manually controlled device for unlocking said locking means, said machine including means for permitting the winding of successive spools without disturbing said selection.

81. In a machine of the kind described, mechanism for tubing a complement of selected yarns through the tubes of a tube frame, and yarn selecting and positioning mechanism for selecting and positioning said complement of yarns, including locking means for maintaining said selection during a plurality of said tubing operations with the same complement of yarns, said machine including means for permitting said plurality of tubing operations without disturbing said selection.

82. In a machine for acting upon tuft-yarns, the combination with yarn selecting and spool-winding mechanism, of means associated therewith for selecting and tubing the yarns before the winding operation.

In testimony whereof, I have signed my name to this specification, in the presence of two subscribing witnesses.

THOMAS P. WALSH.

Witnesses:
EDWARD MAXWELL,
M. J. SPALDING.